(No Model.)

B. A. HUSBANDS.
Cross Cut Saw Handle.

No. 241,019.          Patented May 3, 1881.

Witnesses:
Geo. H. Knight
Geo. D. Knight

Inventor:
Bernard A. Husbands
By Knight Bro.
Attys.

N. PETERS, Photo-Lithographer, Washington, D. C.

UNITED STATES PATENT OFFICE.

BERNARD A. HUSBANDS, OF ST. LOUIS, MO., ASSIGNOR OF TWO-THIRDS TO GEORGE MERCER AND VOLNEY P. HUSBANDS, OF SAME PLACE.

CROSSCUT-SAW HANDLE.

SPECIFICATION forming part of Letters Patent No. 241,019, dated May 3, 1881.

Application filed December 28, 1880. (No model.)

*To all whom it may concern:*

Be it known that I, BERNARD A. HUSBANDS, of the city of St. Louis, in the State of Missouri, have invented a certain new and useful Improvement in Saw-Tangs, of which the following is a full, clear, and exact description, reference being had to the accompanying drawings, forming a part of this specification.

My invention relates to a peculiar construction of saw-tang and mode of attaching it to the saw-blade, as hereinafter described.

Figure 1:
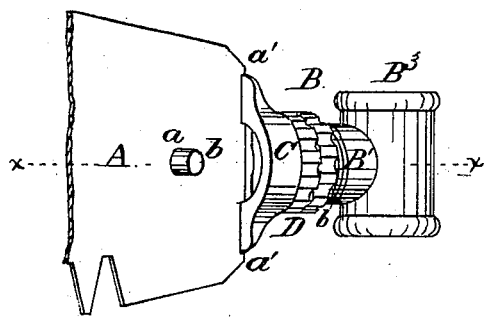
Figure 2:
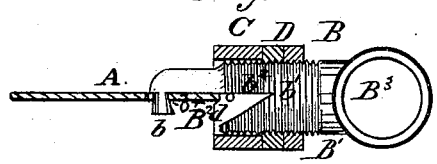
Figure 4:
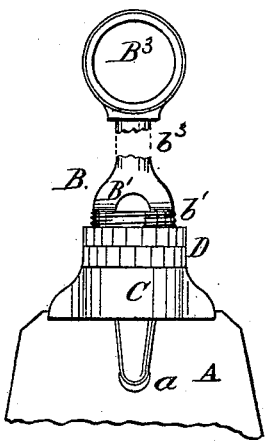
Figure 3:
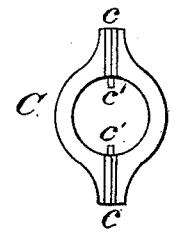

Figure 1 is a perspective view illustrating the improvement. Fig. 2 is a side view with the saw-blade and some other parts in section at line $x\ x$, Fig. 1. Fig. 3 is a front view of the clamping-collar. Fig. 4 shows the improvement as applied to a pit-saw.

A is a portion of a saw having a hole, $a$, therein to receive a stud, $b$, upon the shank $B'$ of the tang B. This stud $b$ is recessed at $b^4$, forming a seat for one side of the hole $a$. The shank is screw-threaded at $b'$.

C is the clamp-collar, with a central bore fitting over the screw-thread, so as to have free endwise movement on the shank.

D is a nut screwing upon the shank, whose office it is to force the collar outward upon the shank. There may be two of the nuts D, as shown, one of them acting as a jam-nut.

The collar C has a groove $c$ in each end or wing to receive the edge or end $a'$ of the saw-blade and hold it fast when the collar is forced against the same by the nut D. The end of the shank is notched at $B^2$ in such a manner that the saw-blade will lie against one side, $b^2$, of the notch and be in line with the axis of the shank. The collar C has upon its interior studs $c'$, which, by contact with the face $b^2$, prevent the collar turning on the shank.

In Fig. 4 the improvement is shown as applied to a pit-saw, (whether for ice or timber,) the shank being shown with a part broken out at $b^3$ and the socket $B^3$ reversed to receive a cross-handle.

I do not claim any novelty in the socket $B^3$, *per se*, nor do I confine myself to this means for the attachment of the handle.

In securing the tang to the blade the stud $b$ is placed in the hole $a$ and the blade engaged in the recess $b^4$, while the nut or nuts D and the collar C are in their backward position upon the shank. The collar C is then pushed outward until the edge of the saw-blade rests in the grooves $c\ c$. The nut D is then turned outward against the collar, so as to clamp the saw tightly.

I claim as my invention—

1. The tang B, having hook or stud $b$, shank $B'$, collar C, nut D, and socket $B^3$, in combination with the saw-blade A, having hole $a$, the said tang being endwise of or in line with the said blade, and the socket transverse thereof, so as to adapt it to either a crosscut or pit or ice saw, as set forth.

2. The saw-tang B, formed with hook or stud $b$, having recess $b^4$, screw-threaded shank $B'\ b'$, excavation $B^2$, and flat face $b^2$ and socket $B^3$.

3. The tang B $b$ $B'$ $b'$ $B^2$ $b^2$, in combination with saw-blade A, having hole $a$, collar C, having grooves $c\ c$, and the nut D, as set forth.

4. The collar C, having studs $c'\ c'$ and grooves $c\ c$, in combination with the tang B, having hook or stud $b$, threaded shank $B'\ b'$, saw-blade A and hole $a$, as set forth.

BERNARD A. HUSBANDS.

Witnesses:
SAML. KNIGHT,
GEO. H. KNIGHT.